(12) United States Patent
Arai et al.

(10) Patent No.: US 7,289,340 B2
(45) Date of Patent: Oct. 30, 2007

(54) SWITCHING POWER SUPPLY DEVICE

(75) Inventors: Yukichi Arai, Hanno (JP); Yukio Yamazaki, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 10 days.

(21) Appl. No.: 10/962,613

(22) Filed: Oct. 13, 2004

(65) Prior Publication Data
US 2006/0077698 A1   Apr. 13, 2006

(51) Int. Cl.
*H02M 3/335* (2006.01)
*H02M 3/24* (2006.01)

(52) U.S. Cl. ............... 363/21.15; 363/97; 323/902

(58) Field of Classification Search ......... 323/902, 323/21.13; 363/21.12, 21.14, 21.17, 21.18, 363/97, 21.15, 80, 89, 44, 96, 99, 21.07, 363/21.01, 83, 85, 94, 45–48
See application file for complete search history.

(56) References Cited

U.S. PATENT DOCUMENTS

| | | | | |
|---|---|---|---|---|
| 5,390,100 | A * | 2/1995 | Palata | 363/19 |
| 5,680,034 | A * | 10/1997 | Redl | 363/21.03 |
| 6,104,622 | A * | 8/2000 | Shin | 363/21.07 |
| 6,236,577 | B1 * | 5/2001 | Bando | 363/19 |
| 6,469,913 | B2 * | 10/2002 | Hosotani et al. | 363/16 |
| 6,646,894 | B2 * | 11/2003 | Hong et al. | 363/21.01 |
| 6,693,811 | B1 * | 2/2004 | Bowman et al. | 363/97 |
| 6,980,444 | B2 * | 12/2005 | Takahashi | 363/21.18 |
| 7,012,819 | B2 * | 3/2006 | Feldtkeller | 363/21.01 |
| 7,016,204 | B2 * | 3/2006 | Yang et al. | 363/21.13 |
| 7,035,119 | B2 * | 4/2006 | Koike | 363/19 |
| 2004/0136206 | A1 * | 7/2004 | Kinoshita et al. | 363/16 |
| 2005/0219864 | A1 * | 10/2005 | Furukoshi et al. | 363/16 |

FOREIGN PATENT DOCUMENTS

JP          10-323028          12/1998

* cited by examiner

*Primary Examiner*—Karl Easthom
*Assistant Examiner*—Harry Behm
(74) *Attorney, Agent, or Firm*—Rader, Fishman & Grauer PLLC; Toshikatsu Imaizumi

(57) ABSTRACT

A novel switching power supply device no more in need of a stand-by signal for turning on/off a switching element is provided. The switching power supply device is configured as having a main switching element Q1, wherein the switching power supply circuit is connected with a pulse oscillation circuit IC1 for outputting pulse signal; the pulse oscillation circuit and an output terminal of the main switching element are connected with an input section of an internal detection circuit 12; the internal detection circuit 12 is configured so as to control timing of switching of the main switching element Q1 upon detection of the pulse signal supplied from the pulse oscillation circuit IC1.

5 Claims, 2 Drawing Sheets

SWITCHING POWER SUPPLY DEVICE

BACKGROUND OF THE INVENTION

1. Field of the Invention

This invention relates to a switching power supply device having a main switching element and a series capacitor in an input line thereof.

2. Description of the Related Art

A circuit drawing of a conventional switching power supply device is shown in FIG. 2. The switching power supply device comprises a main switching element Q1, and is configured as having a switching power supply circuit 1 in which its primary and secondary sides are insulated therebetween by a transformer T1, and a pulse oscillation circuit IC1 for outputting a pulse signal in order to control timing of switching of the main switching element Q1.

To one end of the primary winding of the transformer T1 owned by the switching power supply circuit 1, the drain of the main switching element Q1 composed of an FET is connected in series. The other end of the primary winding of the transformer T1 is connected to one pole of DC terminals of a first rectifier bridge D1, and a series capacitor C4 is connected to one pole of AC terminals of the first rectifier bridge D1. To the series capacitor C4, a photo-coupler PC1 is connected in parallel. One pole of DC terminals of the first rectifier bridge D1 is connected to one end of the primary winding of the transformer T1, and the other pole of the DC terminals of the first rectifier bridge D1 is connected to the source of the main switching element Q1. The drain of the main switching element Q1 is connected to the other end of the primary winding of the transformer T1. Between the two DC terminals of the first rectifier bridge D1, a smoothing capacitor C8 is connected so as to allow itself to serve as a DC power supply based on the rectifying action of the first rectifier bridge D1.

A second series capacitor C3 is connected to the series capacitor C4 on the load side thereof, and the series capacitor C3 is connected to one pole of AC terminals of a second rectifier bridge D2. The other pole of the AC terminals of the second rectifier bridge D2 is connected via a capacitor C6 to the other pole of an AC power source. Between two DC terminals of the second rectifier bridge D2, a smoothing capacitor C11 is connected so as to allow itself to serve as a DC power source based on the rectifying action of the second rectifier bridge D2.

To the DC terminals of the second rectifier bridge D2, a pulse oscillation circuit IC1 is connected. More specifically, one pole of the second rectifier bridge D2 is connected to a power source input terminal VCC of the pulse oscillation circuit IC1, and the other pole of the second rectifier bridge D2 is connected to an RT/CT terminal of the pulse oscillation circuit IC1, respectively. An output terminal OUT of the pulse oscillation circuit IC1 is connected to the gate of the main switching element Q1, and a current detection terminal ISNF of the pulse oscillation circuit IC1 is connected to the source of the main switching element Q1 (Refer to Japanese Published Unexamined Application published by official bulletin No. Hei 10-14227 (see FIG. 1 and Page 3 to 5), etc.).

The pulse oscillation circuit IC1 is connected to a switching element Q4. To the input terminal of the switching element Q4, a stand-by signal sender circuit 5 for sending a stand-by signal from an external device to the switching power supply device is connected. To the output terminal of the switching element Q4, a photo-coupler PC3 is connected, so as to allow a signal received by the photo-coupler PC3 to be further received by the photo-coupler PC1 provided on the input line thereby controlling ON/OFF timing of the main switching element Q1.

The above-described configuration requires the stand-by signal for turning on/off the main switching element Q1, and it was therefore necessary to separately provide the stand-by signal sender circuit 5 which receives the stand-by signal from an external device and sends it to the main switching element Q1. It was still also necessary to match an interface with the external device in order to send or receive the signal, and this has failed in establishing a standard specification and generality.

SUMMARY OF THE INVENTION

The present invention was conceived after considering the aforementioned problems, and an object thereof is to provide a novel switching power supply device no more in need of a stand-by signal for turning on/off a switching element.

In order to accomplish the aforementioned object of the present invention, by using switching pulse(s), electric power is detected so that it is possible to detect increase or decrease in load power, despite extremely small power.

Since the switching power supply device of the present invention can internally detect electric power by an internal detection circuit, so that it is no more necessary to receive any stand-by signal from the external device. Use of this signal even makes it possible to detect any abnormal signal, such as over-current signal, inside the power source.

The switching power supply device of the present invention is configured as having a frequency switching circuit for switching frequency of the pulse signal supplied from the internal detection circuit so as to correct a reference level corresponding to the output power, and also as having a switching element on the output side of the frequency switching circuit so as to determine electric power to be switched corresponding to the output power by turning the switching element on or off. This is successful in reducing the switching loss, raising conversion efficiency of the switching power supply, and in reducing power consumption under light load.

BRIEF DESCRIPTION OF THE DRAWINGS

The present invention will now be described by way of example with reference to the following FIGS., in which.

DESCRIPTION OF THE PREFERRED EMBODIMENTS

Figure 1:
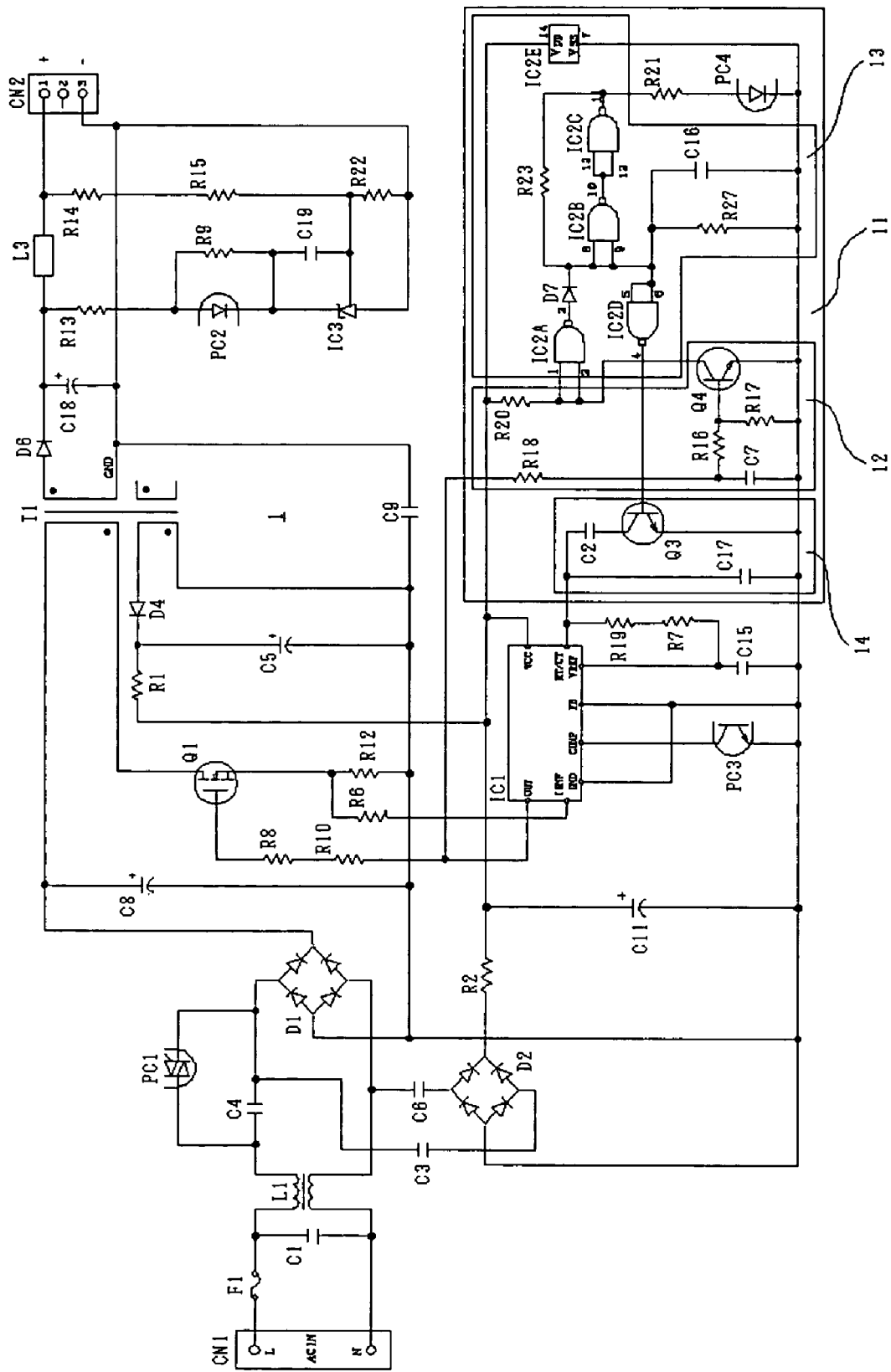
FIG. 1 is a circuit diagram showing an embodiment of a switching power supply device according to the present invention.
Figure 2:
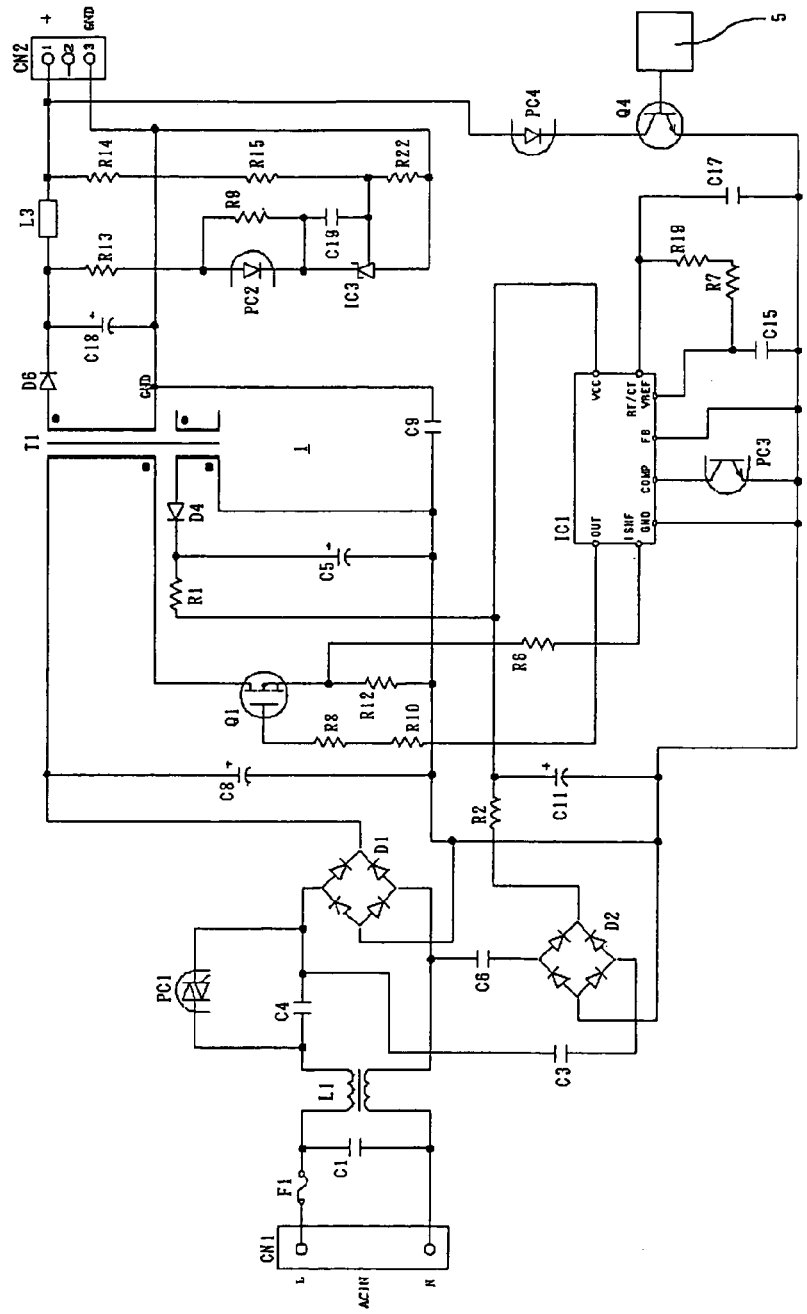
FIG. 2 is a circuit diagram of a conventional switching power supply device.

Description of a switching power supply device according to the present invention will be given referring to the drawings.

FIG. 1 is a circuit diagram showing an embodiment of the switching power supply device according to the present invention. The switching power supply device includes a main switching element Q1, a transformer T1, a pulse oscillation circuit IC1, a photo-coupler (PC1, PC4), a capacitor C4, rectifier bridges D1 and D2, and an internal detection circuit 11 including a pulse detection circuit 12, a DC signal level conversion circuit 13, and a frequency switching circuit 14.

The switching power supply device according to the present invention, comprises a main switching element Q1, a switching power supply circuit 1 in which the primary side and secondary side are insulated therebetween by the transformer T1, and a pulse oscillation circuit IC1 for outputting pulse signal in order to control timing of switching of the main switching element Q1.

To one end of the primary winding of the transformer T1 provided in the switching power supply circuit 1, the drain of the main switching element Q1 composed of an FET is connected in series. The other end of the primary winding of the transformer T1 is connected to one pole of DC terminals of a first rectifier bridge D1, and a series capacitor C4 is connected to one pole of AC terminals of the first rectifier bridge D1. To the series capacitor C4, a photo-coupler PC1 is connected in parallel. One pole of the DC terminals of the first rectifier bridge D1 is connected to one end of the primary winding of the transformer T1, and the other pole of the DC terminals of the first rectifier bridge D1 is connected to the source of the main switching element Q1. The drain of the main switching element Q1 is connected to the other end of the primary winding of the transformer T1. Between the two DC terminals of the first rectifier bridge D1, a smoothing capacitor C8 is connected so as to allow itself to serve as a DC power source based on the rectifying action of the first rectifier bridge D1.

A second series capacitor C3 is connected to the series capacitor C4 on the load side thereof, and the series capacitor C3 is connected to one pole of AC terminals of a second rectifier bridge D2. The other pole of the AC terminals of the second rectifier bridge D2 is connected via a capacitor C6 to the other pole of the AC power source. Between two DC terminals of the second rectifier bridge D2, a smoothing capacitor C11 is connected so as to allow itself to serve as a DC power source based on the rectifying action of the second rectifier bridge D2.

To the DC terminals of the second rectifier bridge D2, a pulse oscillation circuit IC1 is connected. More specifically, one pole of the second rectifier bridge D2 is connected to a power source input terminal VCC of the pulse oscillation circuit IC1, and the other pole of the second rectifier bridge D2 is connected to an RT/CT terminal of the pulse oscillation circuit IC1, respectively. An output terminal OUT of the pulse oscillation circuit IC1 is connected to the gate of the main switching element Q1, and a current detection terminal ISNF of the pulse oscillation circuit IC1 is connected to the source of the main switching element Q1.

There is provided an internal detection circuit 11 for controlling timing of switching of the main switching element Q1 of the switching power supply circuit 1, by detecting a pulse signal supplied from the pulse oscillation circuit IC1. The internal detection circuit 11 comprises a pulse detection circuit 12 for detecting a pulse signal(s) supplied from the pulse oscillation circuit IC1. The pulse detection circuit 12 according to this embodiment comprises resistors R16, R17, R18 and a capacitor C7, the input section of the circuit is connected to the gate of the main switching element Q1 and the output terminal OUT of the pulse oscillation circuit IC1, and the output section of the circuit is connected to the base of the switching element Q4 which comprises a bipolar transistor. It is to be understood that a detectable value of the pulse signal can arbitrarily be adjusted by arbitrarily adjusting circuit arrangement of the resistors R16, R17, R18 and the capacitor C7, and resistivity and capacitance values of the individual elements.

The internal detection circuit 11 according to this embodiment has a DC signal level conversion circuit 13, which is connected between the collector and emitter of the switching element Q4 owned by the pulse detection circuit 12. The DC signal level conversion circuit 13 comprises an integrated circuit IC2 having a plurality of NOT circuits, a diode D7, a capacitor C16 and resistors R23, R27. The specific configuration will be described later.

The collector of the switching element Q4 owned by the pulse detection circuit 12 is connected to the input of a first NOT circuit IC2A, and the output of the NOT circuit IC2A is connected to the anode of the diode D7. The cathode of the diode D7 is connected to a parallel circuit of the resistor R27 and the capacitor C16, and also to the input of a second NOT circuit IC2B, and still also to the input of a fourth NOT circuit IC2D. The output of the second NOT circuit IC2B is connected to the input of a third NOT circuit IC2C. This configuration makes it possible to convert any pulse signal detected by the pulse detection circuit 12 into a DC signal level.

The internal detection circuit 11 according to this embodiment comprises a switching element which is turned on/off in response to signals generated by the DC signal level conversion circuit 13. The switching element is composed of a photo-coupler PC4. The photo-coupler PC4 is connected via a resistor R21 to the output of the third NOT circuit IC2C owned by the DC signal level conversion circuit 13. The photo-coupler PC4 is configured so that the signal received herein is further received by the photo-coupler PC1 disposed at the input level, and the signal is then sent to the main switching element Q1 thereby controlling ON/OFF timing of the main switching element Q1.

The internal detection circuit 11 according to this embodiment is also configured as having a frequency switching circuit 14. The frequency switching circuit 14 is a circuit for switching frequency of the signal generated by the DC signal level conversion circuit 13. The frequency switching circuit 14 comprises a switching element Q3, and the control terminal of the switching element Q3 is connected to the output of the fourth NOT circuit IC2D owned by the DC signal level conversion circuit 13. The circuit is configured so that the first capacitor C2 is connected to the input terminal of the switching element Q3, and the second capacitor C17 is connected in parallel with the series circuit which comprises the switching element Q3 and first capacitor C2, so as to make it possible to determine frequency corresponding to the output power.

Thus-configured switching power supply device operates as follows. AC current generates when electric charge moves respectively between the poles of the AC power source CN1 and correspondent pole plates of the series capacitor C4. The AC current is rectified by the first rectifier bridge D1 during its flow between the AC power source CN1 and the series capacitor C4. The rectification action charges up the smoothing capacitor C8, and allows it to serve as a DC power source. The AC current is also rectified by the second rectifier bridge D2 during its flow between the AC power source CN1 and the two series capacitors C4, C3. The rectification action charges up the smoothing capacitor C11, and allows it to serve as a DC power source.

DC power charged in the smoothing capacitor C8 generates an intermittent primary current by the main switching element Q1 which is turned on or off by a drive pulse output from the output terminal OUT of the pulse oscillation circuit IC1. The primary current flows in a series circuit which comprises the primary winding of the transformer T1, main switching element Q1 and a primary-current-detecting resistor R12, and causes induction on the secondary winding of the transformer T1.

The drive pulse output from the output terminal OUT of the pulse oscillation circuit IC1 is detected by the pulse detection circuit 12 of the internal detection circuit 11, adjusted in the level thereof by the resistors R16, R17, R18 and the capacitor C7 owned by the circuit 12, and output after being inverted by the switching element Q4. The signal output via the switching element Q4 is input to the DC signal level conversion circuit 13.

The DC signal level conversion circuit 13 converts the signal sent via the switching element Q4 into the DC signal level. First, the signal sent from the switching element Q4 is input to the first NOT circuit IC2A, and the signal is then input to the second NOT circuit IC2B via the diode D7. The electric charge relevant to the signal is charged into the capacitor C16. The signal is further input to the third NOT circuit IC2C, and a rectangular wave signal is converted to the DC signal level by these three NOT circuits IC2A, IC2B and IC2C. More specifically, a relatively long duration of ON time of the pulse oscillation circuit IC1 results in a sufficient charging of the capacitor C16, and the conversion proceeds under the ON state of the DC signal level. On the other hand, a relative short duration of ON time of the pulse oscillation circuit IC1 results in only an insufficient charging of the capacitor C16, and the conversion proceeds under the OFF state of the DC signal level. Thus, the signal converted into the DC signal level is sent to the photo-coupler PC4.

The signal received by the photo-coupler PC4 is further received by the photo-coupler PC1 provided in the input line. The signal is then sent via the first rectifier bridge D1 and the second rectifier bridge D2 to the main switching element Q1. The signal which passes through the photo-coupler PC3 is sent to the DC terminals of the two rectifier bridges D1, D2 and to the pulse oscillation circuit IC1, so as to control timing of switching of the main switching element Q1.

The internal detection circuit 11 according to the present embodiment comprises the frequency switching circuit 14, which switches frequency of the signal generated by the DC signal level conversion circuit 13 and determines electric power to be switched, as described below. When the switching element Q4 owned by the internal detection circuit 11 turns off, a HIGH signal is sent to the first NOT circuit IC2A, and converted into a LOW signal in the first NOT circuit IC2A. The LOW signal is further sent via the diode D7 to the second NOT circuit IC2B, and is converted into a HIGH signal in the second NOT circuit IC2B. The HIGH signal is further sent to the third NOT circuit IC2C, and is converted into a LOW signal in the third NOT circuit IC2C. The LOW signal is sent to the photo-coupler PC4, and the signal is sent, as an OFF signal, to the photo-coupler PC1.

On the other hand, the diode D7 is connected to the second NOT circuit IC2B and also with the fourth NOT circuit IC2D. The LOW signal sent to the fourth NOT circuit IC2D is converted into a HIGH signal in the fourth NOT circuit IC2D. The signal is then sent to the switching element Q3 owned by the frequency switching circuit 14, so as to turn the switching element Q3 on. Upon turning-on of the switching element Q3, the capacitor C2 is charged, frequency of the pulse oscillation circuit IC1 is lowered, and electric power is reduced.

On the contrary, when the switching element Q2 owned by the internal detection circuit 11 turns on, a LOW signal is sent to the first NOT circuit IC2A, and is converted into a HIGH signal in the first NOT circuit IC2A. The HIGH signal is further sent via the diode D7 to the second NOT circuit IC2B, and is converted into a LOW signal in the second NOT circuit IC2B. The LOW signal is then sent to the third NOT circuit IC2C, and is converted into a HIGH signal in the third NOT circuit IC2C. The HIGH signal is sent to the photo-coupler PC4, and the signal is sent, as an ON signal, to the photo-coupler PC1.

On the other hand, the HIGH signal sent to the fourth NOT circuit IC2D is converted into a LOW signal in the fourth NOT circuit IC2D. The signal is then sent to the switching element Q3 owned by the frequency switching circuit 14, so as to turn the switching element Q3 off. Upon turning-off of the switching element Q3, the capacitor C2 is discharged, frequency of the pulse oscillation circuit IC1 rises, and electric power increases.

It is to be understood that, although the present embodiment is configured as having the switching power supply circuit having the switching element 2 which is connected in series to the winding of the transformer T1 by which the primary side and secondary side are insulated from each other, the switching power supply circuit can be applied to a chopper type switching power supply circuit which is a non-isolated type switching power circuit.

According to the present invention, by using switching pulse(s), electric power is detected so that it is possible to detect increase or decrease in load power, despite extremely small power.

Since the switching power supply device of the present invention can internally detect electric power by an internal detection circuit, so that it is no more necessary to receive any stand-by signal from the external. Use of this signal even makes it possible to detect any abnormal signal, such as over-current signal, inside the power source.

The switching power supply device of the present invention is configured as having a frequency switching circuit for switching frequency of the pulse signal supplied from the internal detection circuit so as to correct a reference level corresponding to the output power, and also as having a switching element on the output side of the frequency switching circuit so as to determine electric power to be switched corresponding to the output power by turning the switching element on or off. This is successful in reducing the switching loss, raising conversion efficiency of the switching power supply, and in reducing power consumption under light load.

Thus the present invention possesses a number of advantages or purposes, and there is no requirement that every claim directed to that invention be limited to encompass all of them.

The disclosure of Japanese Patent Application Nos. 2002-298286 filed on Oct. 11, 2002 and 2002-365192 Dec. 17, 2002, including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A switching power supply device comprising:
    a switching power supply circuit having a main switching element, wherein said switching power supply circuit is connected to a pulse oscillation circuit for outputting a pulse signal to said switching power supply circuit;
    a pulse detection circuit for detecting the pulse signal output from said pulse oscillation circuit to said main switching element;

a DC signal level conversion circuit for converting the pulse signal detected by said pulse detection circuit into a DC signal level;

a second switching element that is switched by the DC signal level so as to control timing of switching of said main switching element upon detection of the pulse signal supplied from said pulse oscillation circuit;

a series capacitor that is connected between an AC power source and said main switching element, wherein the second switching element is in parallel connected to the series capacitor so as to be short-circuited according to the DC signal level, and the second switching element comprises a photo-coupler.

2. The switching power supply device according to claim 1, wherein the series capacitor is connected to the main switching element via a transformer.

3. The switching power supply device according to claim 1, wherein the series capacitor is connected to the main switching element via a rectifier bridge.

4. A switching power supply device comprising:

a switching power supply circuit having a main switching element, wherein said switching power supply circuit is connected to a pulse oscillation circuit for outputting a pulse signal to said switching power supply circuit;

a pulse detection circuit for detecting the pulse signal output from said pulse oscillation circuit to said main switching element;

a DC signal level conversion circuit for converting the pulse signal detected by said pulse detection circuit into a DC signal level;

a second switching element that is switched by the DC signal level so as to control timing of switching of said main switching element upon detection of the pulse signal supplied from said pulse oscillation circuit;

a series capacitor connected to the second switching element so that the series capacitor is short-circuited according to the DC signal level, wherein the terminals of the series capacitor are automatically short-circuited in synchronization with increase or decrease of an output signal output from said pulse detection circuit, as being bounded by a predetermined pulse detection level; and an internal detection circuit has a frequency switching circuit for switching frequency of the pulse signal generated by said DC signal level conversion circuit, wherein the series capacitor is connected to the main switching element via a transformer.

5. A switching power supply device comprising:

a switching power supply circuit having a main switching element, wherein said switching power supply circuit is connected to a pulse oscillation circuit for outputting a pulse signal to said switching power supply circuit;

a pulse detection circuit for detecting the pulse signal output from said pulse oscillation circuit to said main switching element;

a DC signal level conversion circuit for converting the pulse signal detected by said pulse detection circuit into a DC signal level;

a second switching element that is switched by the DC signal level so as to control timing of switching of said main switching element upon detection of the pulse signal supplied from said pulse oscillation circuit;

a series capacitor connected to the second switching element so that the series capacitor is short-circuited according to the DC signal level, wherein the terminals of the series capacitor are automatically short-circuited in synchronization with increase or decrease of an output signal output from said pulse detection circuit, as being bounded by a predetermined pulse detection level; and an internal detection circuit that has a frequency switching circuit for switching frequency of the pulse signal generated by said DC signal level conversion circuit, wherein the series capacitor is connected to the main switching element via a rectifier bridge.

* * * * *